United States Patent [19]

Nishikawa

[11] Patent Number: 4,876,559
[45] Date of Patent: Oct. 24, 1989

[54] RECORDING APPARATUS HAVING A PRINT PERMISSION CIRCUIT FOR PROTECTING PLURAL RECORDING HEADS DRIVEN IN ACCORDANCE WITH SELECTIVELY APPLIED PRINT SIGNALS FROM OVERLOAD

[75] Inventor: Hiroshi Nishikawa, Tokyo, Japan

[73] Assignee: Canon Kabushiki Kaisha, Tokyo, Japan

[21] Appl. No.: 165,095

[22] Filed: Mar. 7, 1988

[30] Foreign Application Priority Data

Mar. 13, 1987 [JP] Japan .................................. 62-058312

[51] Int. Cl.$^4$ .......................... G01D 15/16; B41J 3/04
[52] U.S. Cl. .............................. 346/140 R; 346/76 PH
[58] Field of Search ........................... 346/140, 76 PH

[56] References Cited

U.S. PATENT DOCUMENTS

| | | | |
|---|---|---|---|
| 4,353,079 | 10/1982 | Kawanabe | 346/140 |
| 4,370,666 | 1/1983 | Noda | 346/76 PH |
| 4,623,899 | 11/1986 | Sakakibara | 346/76 PH |
| 4,639,747 | 1/1987 | Sakurada | 346/140 |
| 4,649,400 | 3/1987 | Naruki | 346/76 PH |

*Primary Examiner*—Joseph W. Hartary
*Attorney, Agent, or Firm*—Fitzpatrick, Cella, Harper & Scinto

[57] ABSTRACT

A recording apparatus comprises a keyboard to input data; a data processor to process the input data; an print unit to output the processed data; and a power supply circuit for supplying a power source to the apparatus and generating a signal to reset the print permission signal generator. The output unit includes recording heads to perform dot recording; a signal generator to generate a control signal and output signals to be selectively supplied to each head; a print permission signal generator which has a differentiating circuit to differentiate the control signal and generates a print permission signal; and a signal line to give the print permission signal to one end each of a plurality of resistors, the other end of each of which is connected to a recording head. Thus, the output signals supplied to the recording heads are pulled up, causing the respective heads to create a dot on a recording medium, only when the print permission signal is present. Each head includes a thermal energy generator for allowing thermal energy to act on liquid to produce a bubble for forming a flying liquid droplet deposited on the recording medium.

6 Claims, 3 Drawing Sheets

RECORDING APPARATUS HAVING A PRINT PERMISSION CIRCUIT FOR PROTECTING PLURAL RECORDING HEADS DRIVEN IN ACCORDANCE WITH SELECTIVELY APPLIED PRINT SIGNALS FROM OVERLOAD

BACKGROUND OF THE INVENTION

1. Field of the Invention

The present invention relates to an electronic apparatus having a printer which prints by dot matrix system and, more particularly, to an electronic apparatus having a printer which prints by a thermal head printing technique, bubble jet printing technique, or the like as a printing technique to realize the dot matrix system.

2. Related Background Art

In the case of using a printing technique using thermal energy such as a thermal head or bubble jet printing technique, if the printing signal were to become abnormal and were always supplied, a printing element section would be abnormally heated, so could be broken by the abnormal heat generation. Particularly, in the case of using the bubble jet printing technique, the printing element section is easily broken and a circuit to prevent such breakage is necessary.

The bubble jet printing technique is a kind of ink jet printing. A corresponding print head is provided every dot and a bubble is generated in an ink covering the print head by the heat generation of the print head. The ink is emitted, by the force of the bubble, from an ink emitting hole (orifice) a bubble being formed from every dot. To heat the print head, the printing signal corresponding to a dot is amplified by a driver and then supplied to the print head. This printing signal is generated for a short time until the print head generates a bubble. This generating time is ordinarily set to a few microseconds.

Therefore, if the printing signal is generated when noise is present in to a printing signal line or when the apparatus is unstable when a power supply switch of the apparatus is turned on or off, the abnormal printing signal can be amplified and supplied to the print head, so that the print head may be abnormally heated and broken. In a conventional technique, breakdown of the print head as explained above is prevented by using a gate circuit. This technique will now be briefly explained with reference to a block diagram shown in FIG. 6.

In FIG. 6:

PCU denotes a print control unit. The PCU generates printing signals $D_1$ to $D_7$ from another circuit (not shown) in the apparatus. The print control unit PCU also generates a control signal CT which is certainly output when either one of the printing signals is generated.

STB indicates a circuit to generate a print permission signal ST. When an abnormal signal is added to the printing signals $D_1$ to $D_7$ due to noise or the like, this abnormal signal is inhibited by the print permission signal ST. When the circuit in the PCU at the time of turn-on/off of the power supply is unstable and an abnormal signal is added to the printing signals $D_1$ to $D_7$, the print permission signal ST is generated to inhibit this abnormal signal.

GT represents a gate circuit for allowing the printing signals $D_1$ to $D_7$ to be output only when the output of these signals is permitted by the print permission signal ST. DR denotes a driver to amplify the printing signals which passed through the gate circuit, thereby outputting head supply signals $H_1$ to $H_7$.

HD indicates a bubble jet head as a heating section in the bubble jet technique. The ink covering the head HD is heated by the potential difference between a voltage $V_p$ which is supplied from a power supply circuit PSC and each voltage of the head supply signals $H_1$ to $H_7$, so that a bubble is generated in the heated ink. The ink is emitted by the force of this bubble, thereby performing the printing operation.

The power supply circuit to generates the head supply voltage $V_p$ and various kinds of voltages which are supplied to the other circuits and an auto clear signal ACL for detecting when various kinds of voltages decrease at the time of the turn-on/off of the power supply. In the conventional apparatus with the foregoing constitution as shown in FIG. 6, the bubble jet head HD is protected by controlling the gate circuit GT so as to inhibit the abnormal signal due to noise or the like by the control signal CT and to inhibit the abnormal signal at the time of the turn-on/off of the power supply by the auto clear signal ACL.

However, in the foregoing conventional apparatus, as many gate circuits as the number of dots of the print head need to be provided in every printing signal line for the purpose of the protection of the print head. Thus, the circuit becomes complicated and the cost increases.

Particularly, in recent years, to improve the printing quality in the bubble jet printing technique, there is a tendency such that the bubble jet heads are densely arranged, so that the dot density is set to a high value of tens of dots or more. In the case of using such high density heads, if the gate circuits are provided for the respective printing signal lines, ten or more ordinary gate ICs are needed. Consequently, such a protecting circuit becomes very expensive.

On the other hand, in recent years, there has been used a method whereby such a drawback of an increase in number of gate circuits is solved by using a gate array. However, even in the gate array, the cost rises due to an increase in number of gates.

SUMMARY OF THE INVENTION

In consideration of the foregoing points, it is an object of the present invention to realize a simple and cheap protecting circuit for print heads by providing means for controlling a common line of a pull-up circuit of each printing signal line.

Another object of the invention is to cheaply protect print heads in a recording apparatus in which state change is caused by allowing a thermal energy to act on a part of a liquid in a liquid passage communicating with an orifice, the liquid is emitted from the orifice on the basis of the state change, and a flying liquid droplet is formed and deposited onto a recording medium, thereby performing the recording.

DETAILED DESCRIPTION OF THE PREFERRED EMBODIMENTS

The present invention will be described in detail hereinbelow with reference to a block diagram showing an electronic apparatus in an embodiment of the invention in FIG. 1.

Figure 1:
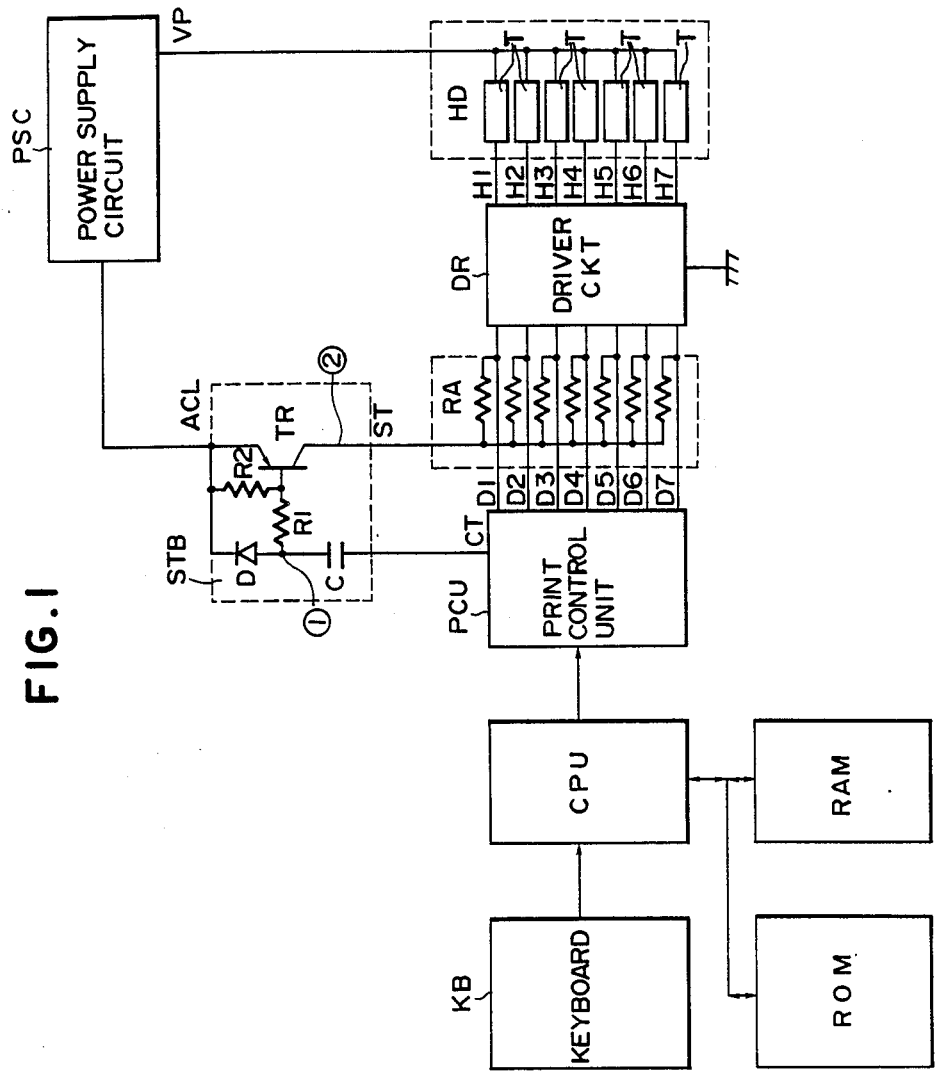
FIG. 1 is a block diagram of an electronic apparatus in an embodiment of the invention.

In FIG. 1:

KB denotes a keyboard which is provided as input means of an electronic apparatus and serves as a keyboard of typewriters, word processors, electronic calculators, or the like.

CPU indicates a central processing unit comprising an arithmetic operation control register, a program counter gate circuit, an adder circuit, and the like. The CPU sequentially executes microprogram commands which are read out and sent from a read only memory ROM, which will be explained hereinafter, in response to operation commands which are input by the; in other words, the CPU processes data input by the keyboard. The CPU also outputs printing data to print the result of the arithmetic operation to the print control unit PCU, which will be explained hereinafter.

ROM denotes the read only memory. Microprogram commands to control the apparatus are stored in the ROM. The ROM sequentially transmits the microcommands responsive to address signals from the CPU, thereby allowing the CPU to execute the control.

RAM indicates a random access memory. The RAM is the memory unit to store the processing data and resultant processed data by the CPU.

PCU represents the print control unit (or signal generator) for converting the printing data sent from the CPU into signals according to the printing means and generating printing or output signals $D_1$ to $D_7$. Since the printing signals $D_1$ to $D_7$ are connected to N-channel open drain terminals, resistors RA, which will be explained hereinafter, are connected to the respective printing signal lines, thereby distinguishing logic "1" and "0". On the other hand, the control signal CT which is certainly output each time the printing signal is output is generated to the print or output permission circuit STB, which will be explained hereinafter.

STB and RA denote means for enabling the present invention to be embodied and denote the print permission circuit and resistors, respectively.

The STB comprises a capacitor C, resistors $R_1$ and $R_2$, and a diode D as a differentiating circuit for differentiating the control signal CT from the PCU and a PNP transistor TR in which the differentiated output is input to a base and an auto clear signal ACL is input to an emitter.

RA denotes the resistors which comprise means to pull up the output signals $D_1$ to $D_7$ of the print control unit PCU.

DR denotes the driver circuit which receives the printing signals $D_1$ to $D_7$ pulled up by the resistors RA and amplifies them and supplies them to a head section HD having a plurality of thermal generating elements T dot printing means.

PSC represents the power supply circuit for generating the head supply voltage $V_p$ and various kinds of voltages which are supplied to the other circuits, although not shown. The PSC detects the reduction of each voltage at the time of turn-on/off of the power supply and generates the auto clear signal ACL for this period of time.

HD indicates the head section as printing means. In this embodiment, the head section HD includes a heater for generating a bubble and emitting the ink droplet from the orifice.

The potential differences among the voltage $V_p$ from the power supply circuit PSC and the head signals $H_1$ to $H_7$ amplified by the driver circuit DR are caused and the head elements T arranged every dot are selectively heated, thereby performing the printing.

In the above arrangement, when a print command key (not shown) provided on the keyboard KB is pressed, the process corresponding to this key is executed by use of the CPU, ROM, and RAM and the printing data to be printed is transferred to the PCU.

Figure 2:
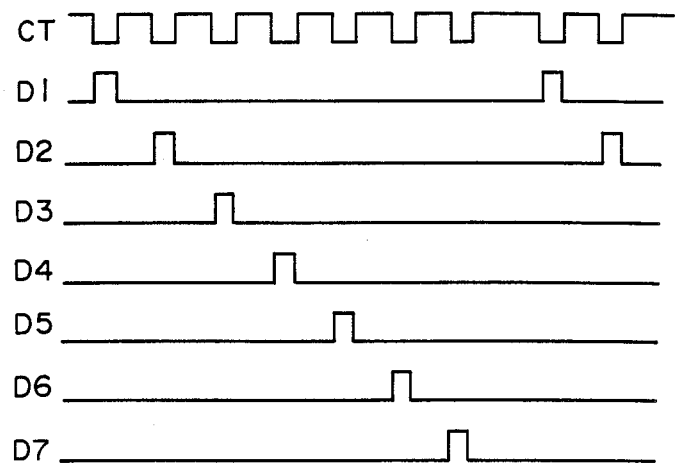
FIG. 2 is a diagram showing the relations among printing signals $D_1$ to $D_7$ and a control signal CT is the electronic apparatus shown in FIG. 1.

The PCU converts the printing data into the printing signals $D_1$ to $D_7$ every dot and also outputs the control signals CT synchronously with the printing signals. The relations among these signals are shown in FIG. 2.

After the control signal CT is differentiated in the print or output permission circuit STB, it is waveform shaped by the transistor TR. This relation is shown in FIG. 3.

If the central processing unit CPU or print control unit PCU runs away due to electrostatic charges or strong power source noise, there is a possibility such that either one of the control signal CT and printing signals $D_1$ to $D_7$ is continuously output. When a current continuously flows to the print head HD for a long period of time, the bubble jet print head or thermal head is burned out. Therefore, the flowing of the current to the print head HD for a long period of time must be prevented even in such an abnormal state due to the foregoing runaway. For this purpose, the control signal CT is differentiated.

Figure 3:
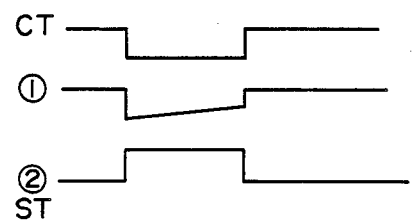
FIG. 3 is a diagram showing the relation between the control signal CT and a print permission signal ST when the apparatus normally operates in the electronic apparatus shown in FIG. 1.
Figure 4:
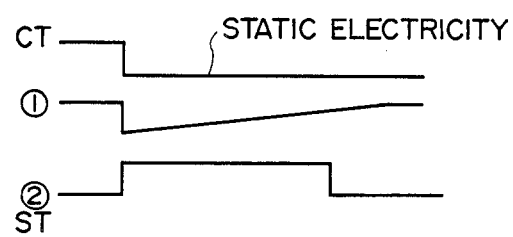
FIG. 4 is a diagram showing the relation between the control signal CT and the print permission signal ST when the apparatus abnormally operates due to electrostatic charges or the like in the electronic apparatus shown in FIG. 1.

A timing chart of FIG. 4 is similar to FIG. 3 and shows timings on the assumption that the CPU or PCU ran away due to electrostatic charges or noise. A waveform of ① corresponds to reference numeral ① in FIG. 1. A waveform of ② is obtained by waveform shaping the differentiated wave of ① by the transistor TR and indicates a waveform at a point of ② in the circuit diagram shown in FIG. 1. A point of ② shown in FIG. 1 represents an output of the print or output permission circuit STB and corresponds to the print or output permission signal ST. When the logic is set to "1", the printing is permitted. When the logic is set to "0", the printing is inhibited. Therefore, even if the CPU or PCU runs away due to electrostatic charges or noise and the control signal CT is continuously output, be differentiating the control signal CT as shown in a point ① in FIG. 4, the print permission signal ST can be set to the inhibiting state after an elapse of a predetermined period of time, thereby enabling the print head HD to be protected.

The auto clear signal ACL is connected to the emitter of the transistor TR in the print permission circuit STB because of the following reasons.

When the power supply voltage to make the CPU or PCU operative decreases, the operation in the unit becomes unstable and not only the processes of the internal registers or gates but also the output signals $D^1$ to $D^7$ become unstable.

Therefore, the control signal CT and printing signals $D_1$ to $D_7$ as output signals of the PCU also become unstable, so that there is a possibility such that they are continuously output.

When a current flows to the print head HD for a long period of time in the foregoing unstable operating state, there is a possibility such that the print head HD will be burned out.

To prevent such problems, the auto clear signal ACL which is set to the inoperative state by the detection of a decrease in power supply voltage is connected to the emitter of the transistor TR.

When the power supply voltage is low, the signal ACL is set to the logic "0": and the print permission signal ST is thus also set to the logic "0". This state is equal to the print inhibiting state. Namely, during the unstable operation when the power supply voltage is low as mentioned above, the printing can be inhibited by connecting the signal ACL to the emitter of the transistor TR.

Figure 5:
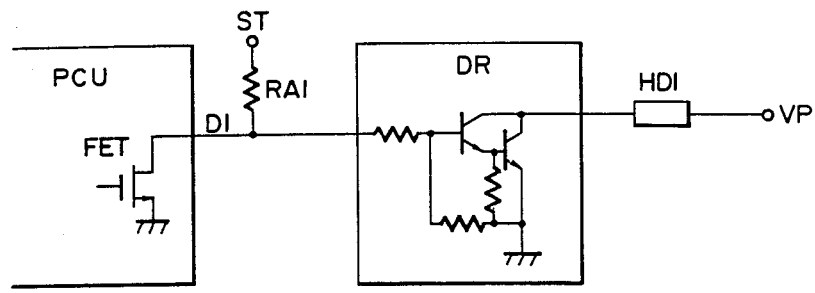
FIG. 5 is a diagram showing internal circuits of a print control unit PCU and a driver DR in the electronic apparatus shown in FIG. 1.
Figure 6:
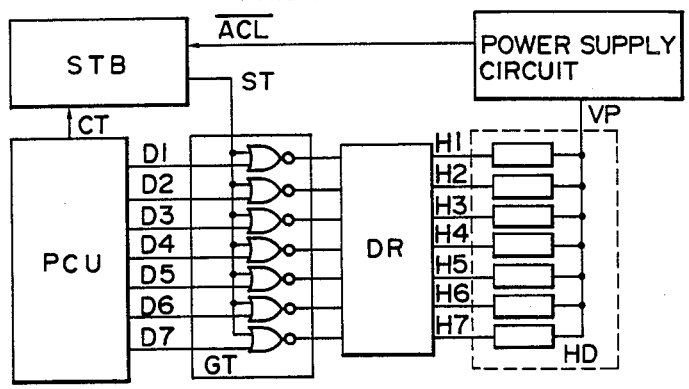
FIG. 6 is a block diagram showing a circuit arrangement according to a conventional method.

FIG. 5 shows a conceptual diagram showing internal circuits of the print control unit PCU and driver DR.

FIG. 5 shows an example of the signal line of the printing signal $D_1$.

A field effect transistor (FET) is provided as an output in the PCU. By controlling an input gate, a circuit between the source and drain of the FET is made conductive or not. When the FET is turned on, the output signal $D_1$ is set to the logic "0" and the print inhibiting state is set. By turning off the FET, the output signal $D_1$ is controlled by one resistor $RA_1$ among the resistors and is controlled by the print permission signal ST connected to the other end of the resistor $RA_1$.

Except the case of the abnormal state, the print permission signal ST is set to the logic "1" when the control signal CT as the output signal of the PCU is set to the logic "0", so that the print permitting state is set. On the other hand, as mentioned above, when the runaway occurs due to the electrostatic charge or power supply noise or the like or when the power supply is unstable, this state is regarded as an abnormal state. Thus, even if the control signals CT is held to the logic "0", the print permission signal is set to the logic "0", thereby setting the print inhibiting state.

Namely, the print permission signal ST decides whether the printing state is the normal print controllable state or not on the basis of either one of the printing signals $D_1$ to $D_7$. By giving the print permission signal to the printing signal through the resistors RA, it is possible to accomplish a state in which the driver DR of the printing signal of the logic "1" can be driven only in the normal state.

When the printing signals $D_1$ to $D_7$ are printed, by driving the driver DR by setting these signals to the logic "1", the printing voltage $V_p$ is applied to one end of the print head HD. The signals obtained by amplifying the printing signals by the driver are given to the other end of the print head HD, so that the printing state is set.

As mentioned above, according to the embodiment using the invention, printing can be inhibited by the resistors without interrupting the detection of the abnormal state and without using any gate. The cost of the electric circuit can be reduced.

Figure 7:
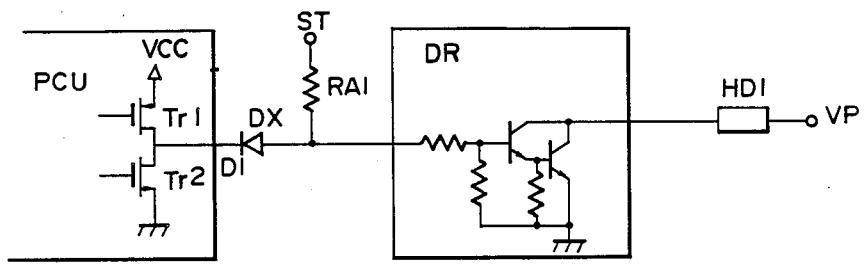
FIG. 7 is a diagram showing a circuit arrangement in another embodiment using the present invention.

In the foregoing embodiment, the case where the printing signals $D_1$ to $D_7$ are the open drain outputs has been described. However, in the case where signals of the logic "1" and "0" are generated as outputs of CMOS devices or the like, by inserting a diode DX as shown in FIG. 7, similar effects can be obtained. On the other hand, a gate array can be also realized by applying the invention. A gate array can be realized and the number of gates can be reduced without departing from the feature of the invention that the print permission signal is applied to the pull-up circuit for the printing signal.

Another embodiment of the invention will now be described hereinbelow with reference to a conceptual diagram shown in FIG. 7.

In the diagram, PCU denotes the print control unit. Although not shown, the printing data sent from the central processing unit CPU is converted into the signal according to the printing means by the PCU and is output as printing signals. An output terminal $D_1$ is one of the output terminals for the printing signals. Two field effect transistors $TR_1$ and $TR_2$ are serially connected, thereby realizing a CMOS output construction.

Although not shown, the signal ST is the print permission signal from the print permission circuit STB. The signal ST is set to the logic "0" when the printing is inhibited. The signal ST is set to the logic "1" when the printing is permitted.

$RA_1$ represents one of resistors to pull up the output signal $D_1$ of the print control unit PCU when the printing is permitted.

Different from the first embodiment mentioned above, the diode DX is provided in the second embodiment of FIG. 7.

Only when the output signal $D_1$ of the PCU is set to the logic "0", the subsequent circuits are influenced by the diode DX.

DR indicates the driver circuit which receives the printing signal $D_1$ which was pulled up by the resistor $RA_1$ as one of the resistors only when the printing is permitted. When the signal $D_1$ is set to the logic "1", the internal transistor is turned on, thereby actuating the head section as the printing means.

$V_p$ denotes the head supply voltage.

$HD_1$ indicates one of the head sections as the printing means.

In the above arrangement, the output signal $D_1$ is set to the logic "1" or "0" in dependence on the on/off of the FETs $Tr_1$ and $Tr_2$ in the PCU.

When $Tr_1$ is turned on and the $Tr_2$ is turned off, the output signal $D_1$ is set to the logic "1". When $Tr_1$ is turned off and $Tr_2$ is turned on, the signal $D_1$ is set to the logic "0".

When the signal $D_1$ is set to the logic "0", even if the print permission signal ST is set to the logic "1" to permit the printing, a current is supplied through the diode DX, so that an input signal of the driver circuit DR is set to the logic "0", thereby inhibiting the printing. When the output signal $D_1$ is set to the logic "1", the input signal of the driver circuit DR is set to the logic "0" or "1" by the print permission signal ST.

In a manner similar to the first embodiment, when the power supply voltage at the time of turn-on/off of the power supply of the electronic apparatus is low, the internal operation becomes unstable and the output signal $D_1$ is set to the logic "1" and the print permission signal ST is set to the logic "0" to prevent the print head HD from being broken. On the other hand, when the internal circuit runs away by electrostatic charges or strong power supply noise, the output signal $D_1$ is set to the logic "1", and the print permission signal ST is set to the logic "0" to prevent the print head HD from being broken.

In a printing state other than the foregoing states, the print permission signal ST is set to the logic "1". Thus, when the output signal $D_1$ is set to the logic "1", the input signal of the driver circuit DR is set to the logic "1". The internal circuit of the driver DR is made operative, thereby actuating the head section $HD_1$ as the printing means.

As mentioned above, according to the second embodiment using the present invention, the cost rises in correspondence to the addition of the diode DX as compared with the first embodiment. However, the cost of the electric circuit can be reduced as compared with the control means a the conventional apparatus.

As explained above, when the apparatus is in the abnormal condition, the printing can be also inhibited by connecting the print permission signal to the pull-up circuit. The print head can be protected at a low cost.

What is claimed is:

1. A recording apparatus comprising a keyboard for inputting data, data processing means connected to said keyboard for processing the data input from the keyboard and an output unit connected to said data processing means for outputting the data processed by said data processing means, wherein said output unit includes:
    a plurality of recording heads for dot recording on a recording medium the data processed by said data processing means when said recording heads are actuated;
    a like plurality of resistors, each having an end connected with a corresponding one of said recording heads;
    signal generating means connected to said data processing means and to said one end of said resistors for generating output signals to be selectively supplied to each of said recording heads and for generating a control signal to control actuation of said recording heads; and
    output permission means connected to said signal generating means and having a differentiating circuit for differentiating the control signal to provide an output permission signal to the other end of each said resistor to permit said plurality of recording heads to be actuated in accordance with the output signals.

2. A recording apparatus according to claim 1, further comprising power supply means connected to said recording heads for supplying power to said recording heads, wherein said power supply means is connected to said output permission means for generating a clear signal to said other end of said resistors for inhibiting actuation of said recording heads.

3. A recording apparatus according to claim 1, wherein said head includes thermal energy generating means for generating thermal energy for forming a flying liquid droplet and recording by depositing the liquid droplet on the recording medium.

4. A recording apparatus comprising:
    a plurality of recording heads for performing printing by providing a dot arrangement a dot arrangement on a recording medium;
    a signal generating circuit for generating printing signals for selectively actuating said recording heads for each dot to be printed;
    a driver circuit connected between said recording heads and said signal generating circuit for applying amplified printing signals to said recording heads;
    a like plurality of pull-up circuits, each said pull-up circuit having an output connected with a corresponding said recording head between said signal generating circuit and said driver circuit; and
    print permission means connected to the input of said pull-up circuits for supplying thereto a print permission signal to permit said recording heads to be actuated in accordance with the printing signals.

5. A recording apparatus according to claim 4, further comprising power supply means for supplying electric power to said print permission means and said recording heads.

6. A recording apparatus according to claim 4, wherein said head includes thermal energy generating means for generating thermal energy for forming a flying liquid droplet and for recording by depositing the liquid droplet on the recording medium.

* * * * *

UNITED STATES PATENT AND TRADEMARK OFFICE
CERTIFICATE OF CORRECTION

PATENT NO. : 4,876,559
DATED : October 24, 1989
INVENTOR(S) : HIROSHI NISHIKAWA

It is certified that error appears in the above-identified patent and that said Letters Patent is hereby corrected as shown below:

IN [57] ABSTRACT

Line 2, "print" should read --output--.
    Line 3, "output" should read --print--.

COLUMN 1

Line 21, "so" should read --and--.
    Line 31, "(orifice)" should read --(orifice),-- and "from" should be deleted.
    Line 39, "to" should be deleted.

COLUMN 2

Line 11, "to" should be deleted.
    Line 52, "state" should read --a state--.
    Line 53, "a" should be deleted.
    Line 65, "is" should read --in--.

COLUMN 3

Line 34, "the; in" should read --the keyboard KB; in--.

COLUMN 4

Line 1, "resistors" should read --resistors,--.
    Line 8, "dot" should read --as dot--.
    Line 23, "head" should be deleted.
    Line 32, "signals CT" should read --signal CT--.
    Line 66, "be" should read --by--.

UNITED STATES PATENT AND TRADEMARK OFFICE
CERTIFICATE OF CORRECTION

PATENT NO. : 4,876,559

DATED : October 24, 1989

INVENTOR(S) : HIROSHI NISHIKAWA

It is certified that error appears in the above-identified patent and that said Letters Patent is hereby corrected as shown below:

COLUMN 5

Line 9, "output signals $D^1$" should read --output signals $D_1$--.
Line 10, "$D^7$" should read --$D_7$--.
Line 24, "logic "0":" should read --logic "0"--.
Line 50, "the" should be deleted.
Line 53, "control signals CT" should read --control signal CT--.

COLUMN 6

Line 57, "the $Tr_2$" should read --$Tr_2$--.

COLUMN 7

Line 26, "means a" should read --means using gates as in--.

UNITED STATES PATENT AND TRADEMARK OFFICE
CERTIFICATE OF CORRECTION

PATENT NO. : 4,876,559
DATED : October 24, 1989
INVENTOR(S) : HIROSHI NISHIKAWA

It is certified that error appears in the above-identified patent and that said Letters Patent is hereby corrected as shown below:

COLUMN 8

Line 24, "a dot arrangement" (second occurrence) should be deleted.

Signed and Sealed this

Eighteenth Day of June, 1991

Attest:

HARRY F. MANBECK, JR.

*Attesting Officer*  *Commissioner of Patents and Trademarks*